United States Patent [19]

Reitz

[11] 4,327,161
[45] Apr. 27, 1982

[54] ELECTROCHEMICAL STORAGE CELL DEVICE

[76] Inventor: Ronald P. Reitz, P.O. Box 1543, Annapolis, Md. 21404

[21] Appl. No.: 164,715

[22] Filed: Jul. 8, 1980

[51] Int. Cl.³ .............................................. H01M 6/30
[52] U.S. Cl. .................................. 429/110; 429/113; 429/127
[58] Field of Search ............... 429/110, 113, 117, 118, 429/122, 3, 48, 50–52, 61, 67, 72, 80, 81, 95, 127

[56] References Cited

U.S. PATENT DOCUMENTS

| | | | |
|---|---|---|---|
| 228,888 | 6/1980 | Griscom | 429/110 X |
| 395,028 | 12/1888 | Bailey et al. | 429/127 |
| 3,743,543 | 7/1973 | Chiku et al. | 429/193 X |
| 3,827,912 | 8/1974 | Justice | 429/14 X |

*Primary Examiner*—Anthony Skapars
*Attorney, Agent, or Firm*—David A. Blumenthal

[57] ABSTRACT

An electrochemical storage cell device provides fluctuating voltage and current to a load to be driven. A plurality of the electrochemical storage cell devices may, when initially charged up, be used to provide alternating current and alternating voltage to a load to be driven. The alternating current and voltage are produced by the selective control of ion passage within the electrochemical storage cell.

10 Claims, 4 Drawing Figures

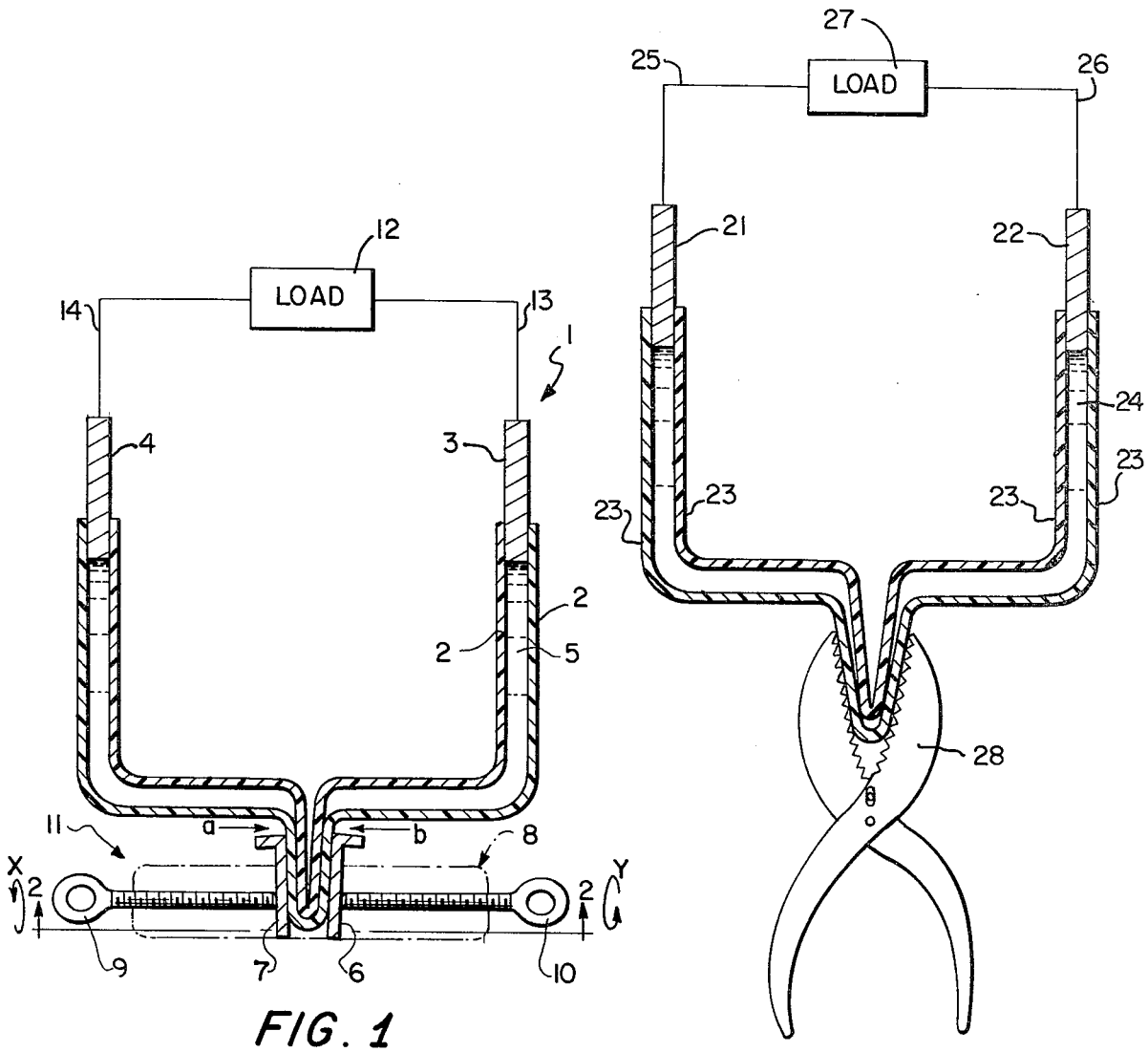
FIG. 1
FIG. 3
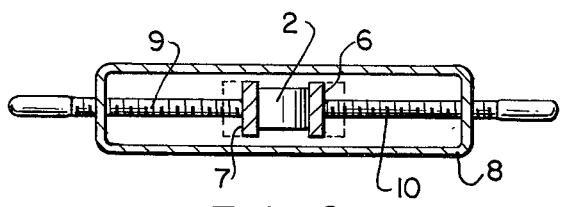
FIG. 2

ELECTROCHEMICAL STORAGE CELL DEVICE

1. Field of the Invention

The field of the invention is in the field of electrochemical storage cells that provide fluctuating voltage and current across their electrodes when discharged.

This invention relates to the utilization of stored electrical energy of a charged electrochemical cell which is provided to an external electrical circuit. Electrochemical cells currently provide direct current and voltage and thus the voltage and current delivered to an external circuit remains relatively constant. The instant invention provides a means whereby, in general, an electrochemical storage cell that utilizes an aqueous electrolyte solution can provide selectively fluctuating voltage and current to an external electrical circuit. The electrochemical storage cell can thereby provide pulsating direct current to the electric circuit. The means whereby this is accomplished comprises an electrochemical storage cell device comprising a first electrode means, a second electrode means spaced from said first electrode means, an electrolyte means positioned so as to be in electrical contact with said first and said second electrode means, an electrically insulative flexible housing means which houses said first and said second electrode means and also houses said electrolyte means, and a means whereby said electrically insulative flexible housing means may be selectively bent or crimped at a position in the housing which is between said first electrode means and said second electrode means. The extent of said bending or crimping is selective such that the bent portion or crimped portion of said electrically insulative flexible housing means impairs or may also selectively prevent the passage of ions in electrolyte solution through the said bent portion or crimped portion of said electrically insulative flexible housing means. Thus, the voltage and current provided by the electrochemical storage cell device upon discharge to an external electrical circuit connected thereto may be selectively fluctuated to produce desired effects. This effect is not limited to a specific aqueous electrolyte solution but may be employed in general by nearly all electrochemical storage cells that utilize an aqueous electrolyte solution.

Thus, it is an object of this invention to provide a means whereby an electrochemical storage cell may be discharged so that the voltage and amperage provided by said discharge may be fluctuated. Thus, the voltage and amperage provided to an external circuit connected electrically to said electrochemical storage cell is selectively fluctuated.

BRIEF DESCRIPTION OF THE DRAWINGS

FIG. 1 is a cross section of the electrochemical storage cell device.

FIG. 2 is a section along line 2—2 of FIG. 1.

FIG. 3 is an alternate embodiment of the electrochemical storage cell device

DETAILED DESCRIPTION OF THE PREFERRED EMBODIMENT

Figure 4:
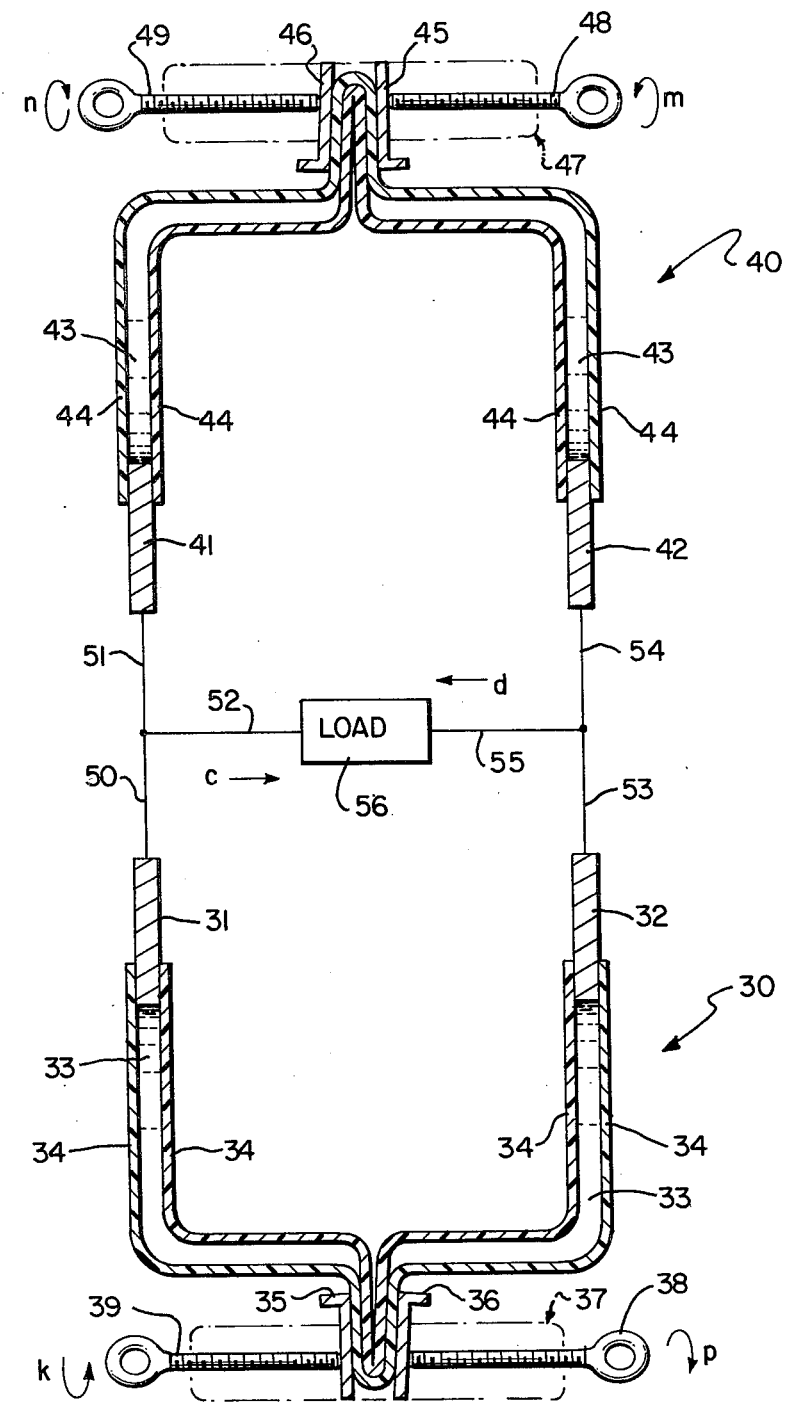
FIG. 4 is a cross section of two of the electrochemical storage cell devices electrically connected to a load.

The following is a discussion and description of preferred specific embodiments of the new method and means of electric energy fluctuation delivered to a load by an electrochemical cell, such being made with reference to the drawings whereon the same reference numerals are used to indicate the same or similar parts and/or structure. It is to be understood that such discussion and description is not to unduly limit the scope of the invention.

FIG. 1 is a cross sectional view of a preferred embodiment. Charged electrochemical storage cell device 1 consists of an electrochemical storage cell and means whereby the flow of electrolytic ions in solution is controlled. Housing means 2 is composed of any suitable flexible, non-porous, electrically insulative material such as plastic or rubber. Electrodes 3 and 4 fit snuggly into the ends of said housing means 2 which is a tube of expandable material. Electrodes 3 and 4 are the electrodes of an electrochemical storage cell and may consist of appropriate materials. Housed within the housing means 2 is an electrolyte solution 5 which physically contacts said electrode means 3 and 4. As shown in FIG. 1, electrode means 3 is spaced from electrode means 4. It is appreciated that this device configuration will function for any materials wherein said electrode means 3 and 4 and the electrolyte solution means 5 comprise the electrodes and the electrolyte soltuion, respectively, of an electrochemical storage cell. An example of such storage cells is the lead acid battery wherein electrode means 3 and 4 comprise lead and lead oxide, respectively, and wherein electrolyte means 5 comprises a solution of sulfuric acid. Another example of such cells is the silver-carbon electric cell, as taught in U.S. Pat. No. 3,114,658 such that electrode means 3 and 4 comprise silver and carbon, respectively, and such that electrolyte means 5 comprises aqueous ferric chloride. It is appreciated that many other examples of electrode-electrolyte combinations can be employed and that the device is NOT LIMITED to merely the aforementionned electrode-electrolyte combinations. It is further appreciated that the device may employ, in general, most electrode-electrolyte combinations that are currently employed in electrochemical storage cells.

Housing means 2 may be bent or crimped as shown in FIGS. 1, 2 and 3. The bent portion or crimped portion or folded portion of the housing may be squeezed at various selected pressures by an appropriate means as shown in FIG. 1. A standard turnbuckle 11 is used as said pressuring means as shown in FIG. 1. It comprises a metal brace member 8, as shown in FIGS. 1 and 2, which supports turnscrews 9 and 10 of FIGS. 1 and 2. Bent flat metal plates 6 and 7 are positioned, as shown in FIGS. 1 and 2, so as to be between housing means 2 and turnscrews 10 and 9 respectively. Said bent flat metal plates 6 and 7 are held in position by friction and by the force exerted upon said bent flat metal plates 6 and 7 by said turnbuckle 11. Turnscrews 9 and 10 may be manually turned in the direction as shown in FIG. 1 so as to exert pressure in the direction of arrows a and b upon metal plates 7 and 6 respectively. Thus metal plates 6 and 7 are held in position.

Initially, said pressure exerted on said metal plates 6 and 7 should not be made so great as to cause the prevention of the flow of electrolytic ions through the bent portion, or folded portion or crimped portion of said housing means 2, said bent or crimped or folded portion of said housing being positioned, as shown in FIG. 1, between said metal plate members 6 and 7.

In operation, electrode means 3 and 4 may be electrically connected to a load 12 by electrically conductive wires 13 and 14.

Turnscrews 9 and 10 may be manually turned in the direction shown by arrows x and y, respectively, as shown in FIG. 1 so as to increase the pressure upon metal plates 6 and 7 in the direction of arrows b and a respectively. As said metal plates 6 and 7 press toward each other, increasing pressure is exerted upon the bent or folded or crimped portion of said housing means 2 disposed therebetween. The action of this increased pressure results in the impairment of the passage of electrolytic ions through the bent or folded or crimped portion of said housing means 2 which is disposed between metal plate 6 and 7. The impairment of said passage of electrolytic ions results in in a decrease in the voltage and amperage delivered to load 12 by the discharging electrochemical storage cell device 11. It is appreciated that further increased pressure upon metal plates 6 and 7 may prevent current and voltage delivered to load 12 by electrochemical storage cell device 1. Afterward, turnscrews 9 and 10 may then be turned manually in a direction opposite arrows x and y respectively shown in FIG. 1 so as to relieve the pressure exerted upon said metal plates 6 and 7 by said turnscrews 9 and 10.

The decrease in said pressure results in a decrease in the pressure upon said housing means 2 by said metal plates 6 and 7. The said decrease in said pressure upon said housing means 2 results in the permission of electrolytic ion flow through the bent or crimped or folded portion of said housing means 2. The process may be continued thereby continuing to permit a greater flow of electrolytic ions through the bent or folded or crimped portion of said housing means 2. Thus the discharging electrochemical storage cell device 1 delivers increasing voltage and amperage to said load 12.

The operation may be repeated resulting in a continued fluctuation of voltage and amperage delivered to said load 12 by electrochemical storage cell device 1.

FIG. 3 shows and alternative embodiment comprising electrode means 21 and 22, electrolyte solution 24, housing means 23 which houses electrolyte 24 such that said electrode means 21 and 22 fit snuggly into said housing means 23 and such that said electrode means 21 and 22 are in physical contact, not with each other, but with said electrolyte solution 24 as shown in FIG. 3. Electrode means 21 and 22 and electrolyte solution means 24 and housing means 23 may comprise the same materials as electrode means 3 and 4, electrolyte means 5 and housing means 2, respectively. Wrench 28 is positioned as shown in FIG. 3 such that said wrench, held firmly by manual means not shown, holds the bent or folded portion of said housing means 23 as shown. Electrode means 21 and 22 are electrically connected to load 27 by electrically conductive wires 25 and 26 as shown in FIG. 3. In operation, wrench 28 may be selectively manually squeezed and released so as to cause the voltage and amperage delivered to load 27 to decrease and increase, respectively.

It is appreciated that many other means for varying the pressure upon the bent or folded or crimped portion of the flexible, electrically insulative, non-porous housing means of the electrochemical storage cell device may be employed. It is further appreciated that the aforementioned embodiments do not unduly limit the scope of the invention.

FIG. 4 shows two charged electrochemical storage cell devices 30 and 40 which are like charged electrochemical storage cell device 1. This electrical system is an example of a system whereby a plurality of devices like charged electrochemical storage cell device 1 may be employed to deliver alternating electric current to an electrical load. It is understood that the following preferred embodiment is not to unduly limit the scope of the uses of the instant invention.

Electrode means 32 and 31, electrolyte solution means 33, housing means 34, bent flat metal plates 35 and 36, metal brace 37 and turnscrews 39 and 38 in FIG. 3 may comprise the same materials as those of electrode means 3 and 4, electrolyte solution means 5, housing means 2, bent flat metal plates 7 and 6, metal brace 8 and turnscrews 9 and 10 as shown in FIG. 1, respectively.

Electrodes 41 and 42, electrolyte solution means 43, housing means 44, bent flate metal plates 45 and 46, metal brace 47 and turnscrews 48 and 49 in FIG. 3 may comprise the same materials as those of electrodes 3 and 4, electrolyte solution means 5, housing means 2, bent flate metal plates 7 and 6, metal brace 8 and turnscrews 9 and 10 as shown in FIG. 1, respectively.

Initially, turnscrews 38 and 39 are turned manually so that metal plates 35 and 36 are pressured toward each other so as to press against the bent or folded or crimped portion of said housing means 34 as shown in FIG. 3 so as to prevent a flow of electrolytic ions through the bent or folded or crimped portion of said housing means 34.

Similarly and also initially turnscrews 48 and 49 are turned manually so that metal flat bent plates 45 and 46 are pressured toward each other so as to press against the bent of folded or crimped portion os said housing means 44 as shown in FIG. 3 so as to prevent a flow of electrolytic ions through the bent or folded or crimped portion of said housing means 44. Electrodes 31, 32, 41 and 42 are electrically connected to load 56 by electrically conductive wires 50, 51, 52, 53, 54 and 55 as shown in FIG. 4.

In operation, turnscrews 38 and 39 may be manually turned in the directions of arrows p and k, respectively, as shown in FIG. 4 so as to gradually relieve some pressure upon metal plates 35 and 36 and the bent or folded or crimped portion of housing means 34 dispoded therebetween. Thus ions of electrolyte solution 33 are thereby permitted to pass through said bent or folded or crimped portion of said housing means 34 in gradually increasing abundances. This in turn, causes charged electrochemical storage cell device 30 to deliver to load 56 increasing amounts of electrical voltage and electrical amperage in in the direction labelled as c in FIG. 3.

Afterward, said turnscrews 39 and 38 are manually turned in directions opposite those of arrows k and p respectively as shown in FIG. 4 so as to increase the pressure of said turnscrews 38 and 39 upon metal plates 36 and 35 and upon the bent or folded or crimped portion of said housing means 34 disposed therebetween. The flow of electrolytic ions through said bent or folded or crimped portion of said housing means 34, which is a tube, thereby becomes increasingly impaired. This action results in decreasing electrical voltage and amperage delivered to load 56 by electrochemical storage cell device 30. When the flow of electrolytic ions through said bent or folded or crimped portion of said housing means 34 is prevented due to pressure exerted upon said housing means 34 by said metal plates 35 and 36, the electric energy delivered to load 56 by said electrochemical storage cell device 30 ceases.

Then said turnscrews 49 and 48 are turned manually in the directions indicated by the arrows labelled n and m respectively, as shown in FIG. 4 so as to decrease the gradually the pressure of said turnscrews 48 and 49 exerted upon metal plates 45 and 46 and upon the bent or folded or crimped portion of said housing means 44 disposed between said metal plates 45 and 46. Thus ions of electrolyte solution 43 are thereby permitted to pass through said bent or folded or crimped portion of said housing means 44 in gradually increasing abundances. This in turn, causes chraged electrochemical storage cell device 40 to deliver to load 56 increasing amounts of electrical voltage and electrical amperage in the direction labelled as d in the FIG. 4.

Afterward, said turnscrews 49 and 48 are manually turned in directions opposite those of arrows n and m respectively as shown in FIG. 4 so as to increase the pressure of said turnscrews 49 and 48 upon metal plates 45 and 46 and upon the bent or crimped or folded portion of said housing means 44, disposed therebetween. The flow of electrolytic ions through said bent or folded or crimped portion of said housing means 44, which is a tube, thereby becomes increasingly impaired. This results in decreasing electrical voltage and amperage delivered to load 56 by electrochemical storage cell device 40. When the flow of electrolytic ions through said bent or folded or crimped portion of said housing means 44 is prevented due to pressure exerted upon said housing means 44 by said metal plates 45 and 46, the electric energy delivered to load 56 by said electrochemical storage cell device 40 ceases.

The operation thus far has delivered one complete cycle to load 56 and may be repeated for further cycles of alternating current.

I claim as my invention:

1. An electrical apparatus comprising:
    (a) a first electrode means comprising the cathode of an electrochemical storage cell that utilizes an electrolyte solution,
    (b) a second electrode means spaced from said first electrode means and comprising the anode of said electrochemical storage cell,
    (c) a flexible non-porous electrically insulative housing means wherein said electrolyte solution and said first and second electrode means are housed such that said first and second electrode means are in physical contact with said electrolyte solution,
    (d) means for bending said flexible non-porous electrically insulative housing means for forming a bent portion thereof, and
    (e) means for applying pressure to said bent portion of said housing means such that said pressure is applied at various selected magnitudes so as to selectively control the flow of electrolyte ions of said electrolyte solution through said bent portion of said flexible non-porous electrically insulative housing means.

2. An apparatus as recited in claim 1 wherein said apparatus further comprises means for electrically connecting said first and second electrode means to an external circuit.

3. An apparatus as recited in claim 1 wherein said first electrode means comprises lead.

4. An apparatus as recited in claim 1 wherein said second electrode means comprises lead oxide.

5. An apparatus as recited in claim 1 wherein said electrolyte solution comprises sulfuric acid.

6. An apparatus as recited in claim 1 wherein said flexible non-porous electrically insulative housing means comprises a tube.

7. An apparatus comprising a plurality of said apparatus that is recited in claim 1.

8. An apparatus as recited in claim 7 further comprising means of connecting said plurality to an external electrical circuit for powering same.

9. An apparatus as described in claim 8 wherein said electrical circuit comprises a load to be driven.

10. An electrical apparatus for use with an electrolyte solution in an electrochemical storage cell comprising:
    (a) a housing for said electrolyte solution wherein said housing is flexible,
    (b) a first and second electrode spacedly positioned from one another and at least partially positioned within said housing so that said first and second electrodes contact said electrolyte solution, and
    (c) means positioned between said first and second electrodes for variably restricting the flow of electrolytic ions from said electrolyte solution from passing between said first and second electrodes such that said variable restricting means comprises means for variably moving at least a portion of said housing providing fluid communication of said electrolyte solution between said first and second electrodes so that the flow of electrolytic ions is variably restricted.

* * * * *